(12) United States Patent
Perret et al.

(10) Patent No.: US 6,476,145 B1
(45) Date of Patent: Nov. 5, 2002

(54) SCHOCKPROOF POLYESTER-INJECTED PARTS

(75) Inventors: Patrice Perret, Mezieres sur Seine (FR); Jacques Komornicki, Francheville (FR); Yoshiyuki Miyaki, Otsu (JP)

(73) Assignee: Atofina (FR)

( * ) Notice: Subject to any disclaimer, the term of this patent is extended or adjusted under 35 U.S.C. 154(b) by 0 days.

(21) Appl. No.: 09/582,664

(22) PCT Filed: Dec. 28, 1998

(86) PCT No.: PCT/FR98/02892

§ 371 (c)(1),
(2), (4) Date: Jun. 29, 2000

(87) PCT Pub. No.: WO99/33917

PCT Pub. Date: Jul. 8, 1999

(30) Foreign Application Priority Data

Dec. 29, 1997 (FR) .............................................. 97 16612

(51) Int. Cl.$^7$ ......................... C08L 37/00; C08L 41/00; C08L 33/04
(52) U.S. Cl. ....................... 525/208; 525/166; 525/170; 525/176; 525/177; 525/206; 525/227; 525/63; 525/64; 525/65; 525/191; 525/231; 525/240; 524/451; 524/515; 524/523; 524/532
(58) Field of Search .............................. 525/63, 64, 65, 525/166, 170, 176, 177, 191, 206, 208, 227, 231, 240; 524/451, 515, 523, 531

(56) References Cited

U.S. PATENT DOCUMENTS

| 4,981,896 A | * | 1/1991 | Okada et al. ................ 524/413 |
| 5,068,283 A | * | 11/1991 | Ohmae et al. ................. 525/64 |
| 5,208,292 A | * | 5/1993 | Hert et al. ................... 525/166 |
| 5,367,013 A | * | 11/1994 | Ohmae et al. .............. 524/494 |
| 5,484,824 A | * | 1/1996 | Abe et al. .................... 523/436 |
| 5,820,780 A | * | 10/1998 | Furuda et al. ........... 252/299.1 |
| 5,891,532 A | * | 4/1999 | Furuda et al. ................. 428/1 |

FOREIGN PATENT DOCUMENTS

| EP | 481471 | 4/1992 |
| EP | 536966 | 4/1993 |
| EP | 747070 | 12/1996 |

\* cited by examiner

*Primary Examiner*—Robert Dawson
*Assistant Examiner*—Jeffrey B Robertson
(74) *Attorney, Agent, or Firm*—Millen, White, Zelano & Branigan, P.C.

(57) ABSTRACT

Polyester injection-moulded parts based on a polyester (A) and on a copolymer (B) of ethylene and of an unsaturated epoxy, such that weight % (B)×MFI (A+B)/MFI(A) is greater than 3 and in this expression:

MFI (A+B) denotes the melt flow index of the modified polyester, that is to say the blend of (A) and (B) and of any fillers;

MFI (A) denotes the melt flow index of the polyester (A) and of any fillers (without (B)); and weight % (B) denotes the percentage by weight of (B) in the blend of (A) and (B) and of any fillers.

19 Claims, No Drawings

SCHOCKPROOF POLYESTER-INJECTED PARTS

The present invention relates to impact-resistant polyester injection-moulded parts and more particularly to injection-moulded parts based on a polyester (A) and on at least one copolymer (B) of ethylene and of an unsaturated epoxy, the copolymer (B) being obtained by copolymerization or grafting of the unsaturated epoxy.

The impact resistance of polyesters is generally improved by incorporating, in the form of a dispersed phase, an impact modifier which is elastomeric and has reactive functional groups (acrylic acid, maleic anhydride, etc.) capable of reacting with functional groups of the polyester matrix. This reactivity ensures fine and homogeneous dispersion of the elastomer and good adhesion at the nodule-matrix interface, but results in a significant drop in the melt flow. This appreciable change in the viscosity is detrimental to the processing, especially in the case of thin or large-sized injection-moulded parts.

The applicant has discovered that by using compositions based on polyester resin and on at least one copolymer of ethylene and of an unsaturated epoxy it was possible to obtain both impact resistance and good melt flow allowing injection moulding of these compositions, provided that the amounts of copolymers and the epoxy content of the copolymer are chosen.

The prior art has already described polyester-based impact-resistance compositions.

U.S. Pat. No. 4,172,859 describes polyesters modified by reactive copolymers in order to increase the impact resistance. The polyester matrix contains 0.01 to 3 micron nodules of reactive copolymer; the reactive copolymer must adhere partly to the matrix, its modulus is between 1 and 20,000 psi (0.007 and 138 MPa) and the ratio of the modulus of the matrix to the modulus of the reactive copolymer is greater than 10. The reactive copolymer may contain up to 50 mol % of glycidyl methacrylate.

No mention is made regarding the viscosity of the polyesters modified in this way. U.S. Pat. No. 4,753,890 describes polyesters such as, for example, polyethylene terephthalate (PET) and polybutylene terephthalate (PBT), modified by ethylene/alkyl (meth)acrylate/glycidyl (meth)acrylate copolymers. Table 1 shows PET or PBT containing 18% of copolymer. It is considered that copolymers containing 2.25 to 8.6% by weight of glycidyl methacrylate (GMA) are suitable for the invention. No mention is made regarding the viscosity.

U.S. Pat. No. 5,208,292 describes PET compositions and PBT compositions modified by a blend of copolymers which crosslink. In that document a PBT is described which contains a blend of a copolymer having GMA units and of a copolymer having maleic inhydride units. It is emphasized that the incorporation of a blend thus crosslinked into the PBT makes it possible to avoid too great a drop in the melt flow index or MFI. Comparative Example 1 shows that a blend of 80 parts of PBT having an MFI of 79.3 (250° C.; 5 kg) and of 20 parts of an ethylene/ethyl acrylate/GMA copolymer having an MFI of 11 (190° C.; 2.16 kg) and containing 12% by weight of GMA resulted in a modified PBT having an MFI of 1.7 (250° C.; 5 kg), making injection-moulded parts impossible.

Thus, the prior art has disclosed polyesters modified by GMA-containing copolymers but was not interested in the melt flow of the polyesters thus modified. Tests and measurements of the properties of these modified polyesters have been carried out on test pieces made by compression moulding or injection moulding.

It is clear that the viscosity is of no importance in the case of such dimensions and under laboratory conditions.

The situation is completely different in the case of thin or larger-sized parts, or those of a complicated shape, these parts having to be produced at industrial rates.

The advantage of the compositions of the invention is the compromise between impact resistance and viscosity.

U.S. Pat. No. 5,208,292 partly solves the problem of the drop in melt flow but at the cost of a blend of copolymers to be crosslinked, which requires having to correctly meter the products according to the amounts of reactive functional groups that they contain.

Another advantage of the invention is that it is necessary to add only a single product to the polyester resin, and not a blend of various products. Another advantage is that the ethylene/unsaturated epoxy copolymer is merely added into the extruder which feeds the injection-moulding machine. This addition may be carried out by a lateral extruder or a granule metering hopper on the polyester extruder. The blend of the polyester resin and of the impact modifier need therefore not be prepared in advance.

The Applicant has discovered that compositions such that weight % (B)×MFI (A+B)/MFI (A) is greater than 3 are perfectly suitable for making the impact-resistant injection-moulded parts of the present invention.

In this expression, MFI (A+B) denotes the melt flow index of the modified polyester, that is to say of the blend of (A) and (B) and any fillers such as glass fibres, fire retardants, antioxidants, etc, and MFI (A) denotes the melt flow index of the same compositions but not containing (B), that is to say MFI (A) denotes the melt flow index of the polyester by itself and of the polyester filled with glass fibres and any fire retardants and antioxidants, etc.

The present invention relates to polyester injection-moulded parts based on a polyester (A) and on an ethylene/unsaturated epoxy copolymer (B), such that the weight % (B)×MFI (A+B)/MFI (A) expression, in which:

MFI (A+B) denotes the melt flow index of the modified polyester, that is to say the blend of (A) and (B) and of any fillers;

MFI (A) denotes the melt flow index of the polyester (A) and of any fillers [without (B)]; and weight % (B) denotes the weight percentage of (B) in the blend of (A) and (B) and of any fillers; is greater than 3.

The term "polyester" denotes polymers which are saturated products resulting from the condensation of glycols with dicarboxylic acids or their derivatives. Preferably, they comprise products resulting from condensation of aromatic dicarboxylic acids, having from 8 to 14 carbon atoms, with at least one glycol chosen from the group consisting of neopentyl glycol, cyclohexanedimethanol and aliphatic glycols of formula $HO(CH_2)_nOH$ in which n is an integer ranging from 2 to 10. Up to 50 mol % of the aromatic dicarboxylic acid may be replaced with at least one other aromatic dicarboxylic acid having from 8 to 14 carbon atoms and/or up to 20 mol % may be replaced with an aliphatic dicarboxylic acid having from 2 to 12 carbon atoms.

The preferred polyesters are polyethylene terephthalate (PET), poly(1,4-butylene terephthalate) (PBT), 1,4-cyclohexylene dimethylene terephthalate(isophthalate) and other esters derived from aromatic dicarboxylic acids such as isophthalic acid, dibenzoic acid and naphthalene dicarboxylic acid, 4,4'-diphenylenedicarboxylic acid, bis(p-carboxyphenyl)methane, ethylene bis (p-benzoic) acid, 1-4-tetramethylene bis(p-oxybenzoic) acid, ethylene bis (paraoxybenzoic) acid, 1,3-trimethylene bis (p-oxybenzoic) acid, and glycols such as ethylene glycol, 1,3-trimethylene glycol, 1,4-tetramethylene glycol, 1,6-hexamethylene glycol, 1,3-propylene glycol, 1,8-octamethylene glycol and 1,10-decamethylene glycol. The MFI of these polyesters, measured at 250° C. and with 2.16 kg, may vary from 2 to 100 and advantageously from 10 to 80.

The ethylene/unsaturated epoxy copolymer (B) may be obtained by copolymerizing ethylene with an unsaturated epoxy or by grafting the unsaturated epoxy onto polyethylene. The grafting may be carried out in a solvent phase or onto the polyethylene in the melt in the presence of a peroxide. These grafting techniques are known per se. As regards the copolymerization of ethylene with an unsaturated epoxy, processes called radical polymerization normally operating at pressures between 200 and 2500 bar may be used.

By way of example of unsaturated epoxies, mention may be made of:

aliphatic glycidyl esters and ethers, such as allyl glycidyl ether, vinyl glycidyl ether, glycidyl maleate and itaconate, glycidyl (meth)acrylate, and, alicyclic glycidyl esters and ethers, such as 2-cyclohexen-1-yl-glycidyl ether, diglycidyl cyclohexene-4,5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate.

The ethylene/unsaturated epoxy copolymer may also comprise other monomers, these possibly being chosen, for example, from:

alpha-olefins, such as propylene, 1-butene, hexene, etc;

vinyl esters of saturated carboxylic acids, such as vinyl acetate or vinyl propionate;

esters of saturated carboxylic acids, such as alkyl (meth) acrylates, possibly having up to 24 carbon atoms.

By way of example, the unsaturated epoxy may be grafted onto the following polymers:

polyethylene, ethylene/alpha-olefin copolymers, polyethylenes such as VLDPE (very-low-density PE), ULDPE (ultra-low-density PE) or metallocene PE;

copolymers of ethylene with at least one vinyl ester of a saturated carboxylic acid, such as vinyl acetate or vinyl propionate;

copolymers of ethylene with at least one unsaturated carboxylic acid ester, such as alkyl (meth)acrylates, possibly having up to 24 carbon atoms;

EPR (ethylene-propylene rubber) elastomers or EPDM (ethylene-propylene-diene monomer);

blends of polymers chosen from the above.

The amount of copolymer (B) may vary over wide limits depending on the properties that are demanded of the blend of (A) and (B); however, amounts up to 25%, and advantageously between 10 and 20%, by weight of (A)+(B) are sufficient.

The Applicant has discovered that, for an identical epoxy content and by varying the amount of copolymer (B) from 10 to 20%, the gain obtained above 15% was much less than the gain obtained when going from 10 to 15%, while the melt flow index dropped significantly.

The Applicant has also discovered that, for a constant amount of copolymer (B), the impact strength was not strictly proportional to the amount of epoxy in the copolymer (B).

The applicant has found that, in order to satisfy the weight % (B)×MFI (A+B)/MFI (A)>3 criterion, it was merely necessary to choose (B) so as to contain an amount of epoxy up to 5%, and preferably 1 to 3%, by weight.

Advantageously, the amount of (B) is 10 to 20% by weight of(B)+(A).

The copolymer (B) of the injection-moulded parts of the invention is advantageously an ethylene/alkyl (meth) acrylate/unsaturated epoxy copolymer.

Advantageously, it may contain up to 40% by weight of alkyl (meth)acrylate.

Advantageously, the epoxy is glycidyl (meth)acrylate.

Advantageously, the alkyl (meth)acrylate is chosen from methyl (meth)acrylate, ethyl acrylate, n-butyl acrylate, isobutyl acrylate and 2-ethylhexyl acrylate.

The amount of alkyl (meth)acrylate is advantageously from 20 to 35%.

The MFI of (B) is advantageously between 2 and 40 and is preferably from 5 to 20 (190° C.–2.16 kg).

This copolymer may be obtained by radical polymerization of the monomers.

The polyester (A) may contain glass fibre. The amount of glass fibre may be up to 35 parts for 65 parts of (A). Advantageously, amounts from 20 to 30 parts are used per 80 to 70 parts of (A), respectively.

According to another embodiment of the invention the copolymer (B) may consist of an ethylene/unsaturated epoxy copolymer (B1) as a blend with a polyolefin (C). The amount of epoxy in (B1) may have any value provided that the weight % (B1+C)×MFI (A+B1+C)/MFI (A)>3 criterion is satisfied.

(B1) may be chosen from the same polymers mentioned in the case of (B) and preferably ethylene/alkyl (meth) acrylate/unsaturated epoxy copolymers.

The amount of epoxy in (B1) may be greater than that in (B), for example up to 10% by weight. This is in fact a dilution of (B1) by (C). The amount of epoxy weight % in (B1)+(C) is in the same proportions as that in (B).

The polyolefin (C) may be chosen from the polymers mentioned above, on which polymers an unsaturated epoxy may have been grafted.

Preferably, (C) is an ethylene/alkyl (meth)acrylate copolymer. The alkyl (meth)acrylate may be chosen from those mentioned above in the description of (B). The MFI of (C) is advantageously between 2 and 40 and preferably is from 5 to 20 (190° C.–2.16 kg). The proportions of (B1) and (C) depend on the amount of epoxy in (B1). By way of example, and in the case of amounts of epoxy of about 5 to 8% by weight of (B1), the proportions of (B1) to (C) are in the ratios from 12/8 to 8/12, or from 40/60 to 10/90.

It would not be outside the scope of the invention to add mineral fillers (talc, $CaCO_3$, Kaolin, etc), reinforcements (glass fibre, mineral fibre, carbon fibre, etc), stabilizers (heat stabilizers and UV stabilizers), fire retardants and colorants.

The compositions of the invention are prepared by the usual techniques for thermoplastics, such as, for example, extrusion or twin-screw mixers.

EXAMPLES

Production of the Examples

Compounding

The compositions are obtained by compounding on a 40 L/D twin-screw extruder provided with a venting system and with a rod-section die, with an output of 12 kg/h and a speed of 300 revolutions/minute. The temperature profiles used are as follows:

PBT base=220/2301240/250/250° C.

PBT base+glass fibre=230/240/250/250/250° C.

Either the components in granule form are dry blended and then introduced into the feed hopper or the PBT base is introduced into the feed hopper and the impact modifier into the melt zone. The two processes result in identical final performance characteristics.

Mouldinq of the Specimens

The granules are dried under reduced pressure at a temperature of 80° C. and then injection moulded in an injection-moulding machine of the Krauss Maffei B1 type (60 t locking pressure) under the following conditions:

Polyester base material temperature: 240–260° C.;
mould: 50° C.
Injection-moulding pressure: 500–600 bar
Dwell pressure: 300 bar
Polyester base+glass fibre Material temperature: 240–280° C.;
mould temperature: 50° C.
Injection pressure: 500–600 bar
Dwell pressure: 400 bar The standardized test pieces (80×10×4 mm$^3$) thus obtained are conditioned for 14 days at 23° C. and 50% relative humidity.

Evaluation

Flexural modulus according to the ISO 178 standard
Impact resistance on prenotched test pieces of the CHARPY type according to the ISO 179 93 1 Ae standard at various temperatures (23° C. and −20° C.).

When the crack propagates through less than 90% of the thickness at the bottom of the notch of the specimen, the reference NB ("Not Broken") is used. The value of the measured energy is nevertheless given for information, without however being interpreted as taking into account the elastic deformations undergone by the specimen and the frictional forces between the specimen and the specimen holder.

Melt flow index (MFI) measured according to the ISO 1133 standard at a temperature of 250° C. and with a weight of 2.16 kg.

Materials used
Various PBT base resins were used:
10 MFI PBT: Pibiter N 100 from Enichem (Italy)
20 MFI PBT: Pibiter N 400 from Enichem (Italy)
45 MFI PBT: Teijin TRB—J from Teijin (Japan)
70 MFI PBT: Duranex 2000 from Polyplastics (Japan) (MFI at 250° C.; 2.16 kg)
Various impact modifiers were evaluated:
Core—shell acrylic elastomer: Paraloid EXL 2300 from Rohm & Haas;
MBS core—shell elastomer: Paraloid EXL 2647 from Rohm & Haas;
Terpol 1: 6 MFI 72/24/8 E/EANGMA copolymer
Terpol 2: 6 MFI 72/24/8 E/MA/GMA copolymer
Terpol 3: 6 MFI 65/30/5 E/BuA/GMA copolymer
Terpol 4: 6 MFI 67.5/30/2.5 E/BuA/GMA copolymer
Terpol 5: 6 MFI 75/24/1 E/MANGMA copolymer
Terpol 6: 6 MFI 67/30/3 E/MA/GMA copolymer
Copol 1: 3 MFI 71/29 E/MA copolymer (MFI: 190° C.; 2.16 kg)

These copolymers are manufactured by high-pressure radical catalysis:
E denotes ethylene
EA denotes ethyl acrylate
MA denotes methyl acrylate
BuA denotes butyl acrylate
GMA denotes glycidyl methacrylate
. . . / . . . / . . . denotes the proportions by weight of the constituents.

The products denoted Terpol 1 to Terpol 5 are sold by Elf Atochem under the reference LOTADER AX, the product Terpol 6 is sold by Sumitomo under the reference BONDFAST, the product Copol 1 is sold by Elf Atochem under the reference LOTRYL.

Table 1

Comparative Example 1: MFI 20 PBT Base

Comparative Examples 2 and 3: PBT composition containing 20% of impact modifier of the core-shell elastomer type (acrylic or MBS). With 20% of impact modifier, the compositions retain good melt flow but the levels of impact strength are not sufficiently high to meet certain specifications.

Comparative Examples 4, 5, 6, 7, 8 and 9: PBT compositions containing 10–15–20% of highly reactive GMA terpol.

These GMA terpols make it possible to obtain satisfactory impact strengths, specially when the modifier content is greater than or equal to 15%. However, the increase in viscosity is such that the compositions cannot be injection moulded correctly.

Examples 1, 2 and 3: PBT composition containing 20% of a GMA terpol of moderate reactivity (Terpol 3, Terpol 4) or of low activity (Terpol 5).

These GMA terpols make it possible to obtain excellent impact strengths while retaining satisfactory melt flow in order to ensure easy processing by injection moulding.

Examples 4, 5 and 6: PBT composition containing 10–15–20% of a GMA terpol average reactivity of (Terpol 4).

The impact strength/melt flow compromise characteristics are maintained over a wide impact-modifier content range (10–20%).

Table 2

Comparative examples 10 and 11: PBT+15–20% Terpol 2 compositions.

Comparative examples similar to comparative examples 8, 9, but with a more fluid (70 MFI) PBT base. In the same way, the impact strengths are excellent but the change in viscosity with respect to the PBT base is too great.

Examples 7, 8, 9 and 10: PBT+15–20% of Terpol 5 or Terpol 6 compositions.

The GMA terpols having a low GMA content (Terpol 5 in Examples 7 and 8) or having a moderate GMA content (Terpol 6 in Examples 9 and 10) make it possible to have satisfactory impact strengths while having an appreciably smaller change in viscosity as compared with the base, making it possible to injection mould the compositions correctly.

Examples 11 and 12: PBT+10% Terpol 5 or Terpol 6 compositions.

Examples 11 and 12 are similar to Examples 7 and 9, but the speed of rotation of the twin-screw extruder was increased from 300 to 400 revolutions/minute (rpm) (at constant output). This change has made it possible to significantly increase the impact strengths while maintaining a satisfactory change in viscosity.

Table 3

Comparative Example 12: An example similar to comparative Example 8, but with a more viscous (10 MFI) PBT base.

The highly reactive GMA terpol (Terpol 2) results in excellent impact strengths but the change in viscosity with respect to the base is still very great.

Example 13: An example similar to example 2; here again, the moderately reactive GMA Terpol (Terpol 4) makes it possible to obtain a better impact strength/melt flow compromise.

Examples 14, 15, 16 and 17: PBT+GMA Terpol+Copol compositions as a dry blend.

The dilution of a highly reactive GMA terpol (Terpol 2 in Examples 14 and 15) or moderately reactive GMA terpol (Terpol 4 in Examples 16 and 17) in a non-reactive E-MA copolymer (Copol 1) also makes it possible to limit the change in melt flow with respect to the PBT/GMA terpol binary blends (Comparative Example 12 and Example 13) while maintaining excellent strengths.

Examples 18, 19 and 20: PBT+(GMA terpol+copol) pre-blend compositions.

Example 18 repeats the conditions of Example 15, but by making beforehand a GMA terpol/E-MA copol preblend which is introduced with the PBT as a dry blend.

Similar performance is obtained. Examples 19 and 20 demonstrate that it is possible to greatly dilute a GMA terpol in an E-MA copol so as to improve the melt flow of the compound while maintaining good impact strengths.

Table 4

Comparative Example 13: PBT+30% GF (reinforced base reference).

Comparative Examples 14 and 15: PBT+30% GF+10–15% GMA terpol (Terpol 2).

Introduction of the additives into the melt zone is carried out in the following manner. Firstly, the glass fibre is introduced and then, subsequently, a highly reactive GMA terpol (Terpol 2).

Although the impact properties are excellent, the change in melt flow with respect to the non-impact-modified reinforced based is too great and unacceptable for injection-moulding applications.

Comparative Example 16: Introduction of the GMA terpol prior to the glass fibre accentuates the phenomenon.

Examples 21 and 22: Examples similar to comparative Examples 14 and 15 in which Terpol 2 is substituted with Terpol 5. The impact strength levels obtained are satisfactory and the change in melt flow is appreciably less.

Example 23: An example similar to Comparative Example 16 in which Terpol 2 is substituted with Terpol 5. Identical conclusions to those for Examples 21 and 22 may be drawn.

Comparative Example 17: PBT+30% GF, reinforced base reference with a more fluid (45 MFI instead of 20 MFI) PBT resin.

Comparative Examples 18 and 19: Similar examples to comparative Examples 14 and 15 but with a more fluid (45 MFI) PBT resin. The change in melt flow is still as large as with the highly reactive Terpol 2.

Examples 24 and 25: Similar examples to Examples 21 and 22 but with a more fluid (45 MFI) PBT resin. These compositions make it possible to obtain similar performance, but with a small change in viscosity.

TABLE 1

| Example | Composition | (B) % | CHARPY impact strength kJ/m$^2$ 23° C. | CHARPY impact strength kJ/m$^2$ −20° C. | Flexural modulus MPa | MFI dg/min | % B × MFI (A + B) / MFI (A) |
|---|---|---|---|---|---|---|---|
| COMP. 1 | 20 MFI PBT | 0 | 3.1 | 2.5 | 2260 | 20 | |
| COMP. 2 | 20 MFI PBT + 20% acrylic elastomer | 20 | 16 | 9.2 | 1717 | 7.2 | 7.20 |
| COMP. 3 | 20 MFI PBT + 20% MBS | 20 | 18 | 11 | 1546 | 5.1 | 5.10 |
| COMP. 4 | 20 MFI PBT + 10% Terpol 1 | 10 | 10.2 | 8.2 | 1859 | 5.7 | 2.85 |
| COMP. 5 | 20 MFI PBT + 15% Terpol 1 | 15 | NB(48) | 9.4 | 1641 | 0.7 | 0.53 |
| COMP. 6 | 20 MFI PBT + 20% Terpol 1 | 20 | NB(75) | 9.8 | 1405 | 0.1 | 0.10 |
| COMP. 7 | 20 MFI PBT + 10% Terpol 2 | 10 | 12.7 | 6.4 | 1812 | 3.3 | 1.65 |
| COMP. 8 | 20 MFI PBT + 15% Terpol 2 | 15 | NB(45) | 8.9 | 1569 | 1.1 | 0.83 |
| COMP. 9 | 20 MFI PBT + 20% Terpol 2 | 20 | NB(90) | 10.6 | 1351 | 0.2 | 0.20 |
| EX. 1 | 20 MFI PBT + 20% Terpol 3 | 20 | NB(61) | 9.8 | 1450 | 3 | 3.00 |
| EX. 2 | 20 MFI PBT + 20% Terpol 4 | 20 | NB(57) | 13 | 1467 | 3.5 | 3.50 |
| EX. 3 | 20 MFI PBT + 20% Terpol 5 | 20 | NB(45) | 10.9 | 1393 | 4.2 | 4.20 |
| EX. 4 | 20 MFI PBT + 10% Terpol 4 | 10 | 26 | 9.1 | 1947 | 8 | 4.00 |
| EX. 5 | 20 MFI PBT + 15% Terpol 4 | 15 | NB(35) | 11 | 1665 | 4.8 | 3.60 |
| EX. 6 | 20 MFI PBT + 20% Terpol 4 | 20 | NB(57) | 13 | 1467 | 3.5 | 3.50 |

TABLE 2

| Example | Composition | (B) % | CHARPY impact strength kJ/m$^2$ 23° C. | CHARPY impact strength kJ/m$^2$ −20° C. | MFI dg/min | % B × MFI (A + B) / MFI (A) |
|---|---|---|---|---|---|---|
| | 70 MFI PBT | 0 | 3.1 | 2.7 | 69 | |
| COMP. 10 | 70 MFI PBT + 15% Terpol 2 | 15 | NB(45) | 12 | 12 | 2.61 |
| COMP. 11 | 70 MFI PBT + 20% Terpol 2 | 20 | NB(53) | 16.1 | 5.1 | 1.48 |
| EX. 7 | 70 MFI PBT + 15% Terpol 5 | 15 | 14.2 | 7.6 | 40 | 8.70 |

TABLE 2-continued

| Example | Composition | (B) % | CHARPY impact strength kJ/m² 23° C. | CHARPY impact strength kJ/m² −20° C. | MFI dg/min | % B × MFI (A + B) / MFI (A) |
|---|---|---|---|---|---|---|
| EX. 8 | 70 MFI PBT + 20% Terpol 5 | 20 | NB(50) | 12.3 | 27.4 | 7.94 |
| EX. 9 | 70 MFI PBT + 15% Terpol 6 | 15 | NB(36) | 10.4 | 22.8 | 4.96 |
| EX. 10 | 70 MFI PBT + 20% Terpol 6 | 20 | NB(53) | 14.9 | 17.3 | 5.01 |
| EX. 11 | 70 MFI PBT + 15% Terpol 5 (450 rpm) | 15 | NB(44) | 11 | 35.4 | 7.70 |
| EX. 12 | 70 MFI PBT + 15% Terpol 6 (450 rpm) | 15 | NB(53) | 13.7 | 21 | 4.57 |

TABLE 3

| Example | Composition | (B) or (B1) + (C) % | CHARPY impact strength kJ/m² 23° C. | CHARPY impact strength kJ/m² −20° C. | Flexural modulus MPa | MFI dg/min | % B × MFI (A + B) / MFI (A) or % (B1 + C) × MFI (A + B1 + C) / MFI (A) |
|---|---|---|---|---|---|---|---|
|  | 10 MFI PBT |  | 3.5 | 2.8 | 2260 | 10 |  |
| COMP. 12 | 10 MFI PBT + 20% Terpol 2 | 20 | NB | 9.5 | 1410 | 0.1 | 0.20 |
| EX. 13 | 10 MFI PBT + 20% Terpol 4 | 20 | NB | 11 | 14.52 | 2 | 4.00 |
| EX. 14 | 10 MFI PBT + 12% Terpol 2 + 8% COPOL 1 | 20 | NB | 10 | 1380 | 1.5 | 3.00 |
| EX. 15 | 10 MFI PBT + 8% Terpol 2 + 12% COPOL 1 | 20 | NB | 10 | 1456 | 1.7 | 3.40 |
| EX. 16 | 10 MFI PBT + 12% Terpol 4 + 8% COPOL 1 | 20 | NB | 11 | 1488 | 3.9 | 7.80 |
| EX. 17 | 10 MFI PBT + 8% Terpol 4 + 12% COPOL 1 | 20 | NB | 11 | 1445 | 5.2 | 10.40 |
| EX. 18 | 10 MFI PBT + 20% preblend (40% Terpol 2 + 60% COPOL 1) | 20 | NB | 8.8 | 1425 | 1.5 | 3.00 |
| EX. 19 | 10 MFI PBT + 20% preblend (20% Terpol 2 + 80% COPOL 1) | 20 | NB | 8.3 | 1469 | 1.6 | 3.20 |
| EX. 20 | 10 MFI PBT + 20% preblend (10% Terpol 2 + 90% COPOL 1) | 20 | NB | 8.8 | 1482 | 2.4 | 4.80 |

TABLE 4

| Example | Composition | (B) % | CHARPY impact strength kJ/m² 23° C. | CHARPY impact strength kJ/m² −20° C. | Flexural modulus MPa | MFI dg/min | % B × MFI (A + B) / MFI (A) |
|---|---|---|---|---|---|---|---|
| COMP. 13 | 20 MFI PBT + 30% GF | 0 | 7.6 | 7.3 | 7501 | 5.7 |  |
| COMP. 14 | 20 MFI PBT + 30% GF + 10% Terpol 2 | 10 | 14.2 | 10.8 | 5575 | 0.3 | 0.53 |
| COMP. 15 | 20 MFI PBT + 30% GF + 15% Terpol 2 | 15 | 22.7 | 11.8 | 4863 | 0.1 | 0.26 |
| COMP. 16 | 20 MFI PBT + 15% Terpol 2 + 30% GF | 15 | 22.5 | 11.9 | 5281 | 0.05 | 0.13 |
| EX. 21 | 20 MFI PBT + 30% GF + 10% Terpol 5 | 10 | 10 | 8.3 | 5547 | 5.5 | 9.65 |
| EX. 22 | 20 MFI PBT + 30% GF + 15% Terpol 5 | 15 | 14.7 | 9.1 | 3952 | 2.8 | 7.37 |
| EX. 23 | 20 MFI PBT + 15% Terpol 5 + 30% GF | 15 | 9.8 | 8.2 | 4787 | 1.2 | 3.16 |
| COMP. 17 | 45 MFI PBT + 30% GF | 0 | 7.2 | 7.2 | 4991 | 27.6 |  |
| COMP. 18 | 45 MFI PBT + 30% GF + 10% Terpol 2 | 10 | 11.6 | 11.4 | 4459 | 1.5 | 2.63 |
| COMP. 19 | 45 MFI PBT + 30% GF + 15% Terpol 2 | 15 | 21.9 | 12.1 | 3720 | 0.2 | 0.53 |
| EX. 24 | 45 MFI PBT + 30% GF + 10% Terpol 5 | 10 | 12.9 | 9 | 4416 | 18.1 | 31.75 |
| EX. 25 | 45 MFI PBT + 30% GF + 15% Terpol 5 | 15 | 14.6 | 10.6 | 4055 | 15 | 39.47 |

What is claimed is:

1. A polyester injection-moulded part based on a blend of polyethylene terepthalate (A) and a copolymer (B) of ethylene and of an unsaturated epoxy, such that (weight % (B)×MFI (A+B))/MFI (A) is greater than 3 wherein:

MFI (A+B) denotes the melt flow index of the blend of (A) and (B) and optional fillers;

MFI (A) denotes the melt flow index of the polyester (A) and optional fillers, without (B); and weight % (B) denotes the percentage by weight of (B) in the blend of (A) and (B) and optional fillers.

2. A part according to claim 1, in which (B) is an ethylene/alkyl (meth)acrylate/glycidyl (meth)acrylate copolymer.

3. A part according to claim 1, in which (B) contains up to 5% by weight of epoxy.

4. A part according to claim 1, in which the amount of (B) is 10 to 25% by weight of (B)+(A).

5. A part according to claim 1, in which (B) is a blend of (B1) and of a polyolefin (C), (B 1) being chosen from the copolymers (B).

6. A part according to claim 5, in which (B1) is an ethylene/alkyl (meth)acrylate/unsaturated epoxy copolymer.

7. part according to claim 5, in which (C) is an ethylene/ alkyl (meth)acrylate copolymer.

8. A part according to claim 3, wherein (B) contains 1 to 3% by weight of epoxy.

9. A polyester injection-molded part based on a blend of polybutylene terephthalate (A) and an ethylene/alkyl (meth) acrylate/glycidyl (meth)acrylate copolymer (B), such that (weight % (B)×MFI (A+B))/MFI (A) is greater than 3 wherein:

MFI (A+B) denotes the melt flow index of the blend of (A) and (B) and optional fillers;

MFI (A) denotes the melt flow index of the polyester (A) and optional fillers, without (B); and weight % (B) denotes the percentage by weight of (B) in the blend of (A) and (B) and optional fillers.

10. A polyester injection-molded part comprising:

a polyester (A) and a blend (B) wherein the blend (B) comprises a copolymer (B1) comprising ethylene and an unsaturated epoxy and a copolymer (C) of an ethylene/alkyl (meth)acrylate copolymer, such that (weight % (B)×MFI (A+B))/MFI (A) is greater than 3 wherein:

MFI (A+B) denotes the melt flow index of (A) and (B), and optionally, at least one filler;

MFI (A) denotes the melt flow index of the polyester (A) without (B), and optionally, at least one filler; and weight % (B) denotes The percentage by weight of (B) in (A) and (B), and optionally, at least one filler.

11. A part according to claim 6, in which (C) is an ethylene/alkyl (meth)acrylate copolymer.

12. A part according to claim 10, wherein (A) is polyethylene terephthalate (PET).

13. A part according to claim 10, wherein (A) is polybutylene terephthalate (PBT).

14. A part according to claim 1, wherein the amount of (B) is 10–25% by weight of (B)+(A).

15. A part according to claim 1, wherein (A) comprises a fillet of talc, $CaCO_3$, kaolin, or combinations thereof.

16. A part according to claim 1, wherein the amount of (A) is 55–90% by weight of the blend.

17. A polyester injection-molded part comprising a blend, wherein the blend comprises:

a polyester (A) and a blend (B) wherein the blend (B) comprises a copolymer (B1) consisting essentially of ethylene and an unsaturated epoxy and a copolymer (C) of an ethylene/alkyl (meth)acrylate copolymer, such that (weight % (B)×MFI (A+B))/MFI (A) is greater than 3 wherein:

MFI (A+B) denotes the melt flow index of the blend of (A) and (B), and optionally, at least one filler;

MFI (A) denotes the melt flow index of the polyester (A) without (B), and optionally, at least one filler; and weight % (B) denotes the percentage by weight of (B) in the blend of (A) and (B), and optionally, at least one filler.

18. A polyester injection-molded part comprising a blend, wherein the blend comprises:

a polyester (A) and a blend (B) wherein the blend (B) comprises a copolymer (B1) consisting of ethylene and an unsaturated epoxy and a copolymer (C) of an ethylene/alkyl (meth)acrylate copolymer, such that (weight % (B)×MFI (A+B)) MFI (A) is greater than 3 wherein:

MFI (A+B) denotes the melt flow index of the blend of (A) and (B), and optionally, at least one filler;

MFI (A) denotes the melt flow index of the polyester (A) without (B), and optionally, at least one filler; and weight % (B) denotes the percentage by weight of (B) in the blend of (A) and (B), and optionally, at least one filler.

19. A part according to claim 9, in which (B) is a blend of B1) a of a polyolefin (C), (B1) being chosen from the copolymers (B).

* * * * *

UNITED STATES PATENT AND TRADEMARK OFFICE
CERTIFICATE OF CORRECTION

PATENT NO. : 6,476,145 B1  Page 1 of 1
DATED : November 5, 2002
INVENTOR(S) : Patrice Perret et al.

It is certified that error appears in the above-identified patent and that said Letters Patent is hereby corrected as shown below:

Column 9,
Line 54, reads "terepthalate" should read -- terephthalate --

Column 12,
Line 31, reads "B1) a of a" should read -- (B1) and of a --

Signed and Sealed this

Sixteenth Day of March, 2004

JON W. DUDAS
*Acting Director of the United States Patent and Trademark Office*